United States Patent
Lee et al.

(10) Patent No.: US 8,094,839 B2
(45) Date of Patent: Jan. 10, 2012

(54) MICROELECTROMECHANICAL SYSTEM (MEMS) DEVICE WITH SENSTIVITY TRIMMING CIRCUIT AND TRIMMING PROCESS

(75) Inventors: Chien-Hsing Lee, Hsinchu County (TW); Tsung-Min Hsieh, Taipei County (TW); Shao-Yi Wu, Taoyuan County (TW)

(73) Assignee: Solid State System Co., Ltd., Hsinchu (TW)

( * ) Notice: Subject to any disclaimer, the term of this patent is extended or adjusted under 35 U.S.C. 154(b) by 464 days.

(21) Appl. No.: 12/432,758

(22) Filed: Apr. 30, 2009

(65) Prior Publication Data

US 2010/0277229 A1 Nov. 4, 2010

(51) Int. Cl.
*H03F 99/00* (2009.01)
*H04R 1/00* (2006.01)
*H02B 1/00* (2006.01)
*H03G 3/00* (2006.01)

(52) U.S. Cl. ........ 381/120; 381/111; 381/113; 381/123; 381/104

(58) Field of Classification Search .................. 381/104, 381/111, 113, 120, 123
See application file for complete search history.

(56) References Cited

U.S. PATENT DOCUMENTS

| | | | | |
|---|---|---|---|---|
| 5,473,315 A | * | 12/1995 | Holroyd | 340/683 |
| 5,514,948 A | * | 5/1996 | Okazaki | 323/314 |
| 5,604,808 A | * | 2/1997 | Takeda et al. | 381/7 |
| 5,838,807 A | * | 11/1998 | Andersson et al. | 381/321 |
| 6,114,843 A | * | 9/2000 | Olah | 323/280 |
| 6,169,393 B1 | * | 1/2001 | Hashimoto | 323/354 |
| 2002/0015506 A1 | * | 2/2002 | Aceti et al. | 381/314 |
| 2002/0141606 A1 | * | 10/2002 | Schweder et al. | 381/116 |
| 2003/0179896 A1 | * | 9/2003 | Putvinski | 381/323 |
| 2008/0136381 A1 | * | 6/2008 | Yang et al. | 323/220 |

* cited by examiner

*Primary Examiner* — Luan C Thai
(74) *Attorney, Agent, or Firm* — Jianq Chyun IP Office

(57) ABSTRACT

A microelectromechanical system (MEMS) device includes a diaphragm capacitor, connected between a capacitor biasing voltage source and a ground. A source follower circuit is coupled to the diaphragm capacitor. An amplifier is coupled to the source follower circuit to amplify the voltage signal as an output voltage signal. A programmable trimming circuit is implemented with the amplifier to trim a gain or implemented with the capacitor biasing voltage source to trim voltage applied on the diaphragm capacitor. Whereby, the output voltage signal has a target sensitivity.

16 Claims, 13 Drawing Sheets

US 8,094,839 B2

MICROELECTROMECHANICAL SYSTEM (MEMS) DEVICE WITH SENSTIVITY TRIMMING CIRCUIT AND TRIMMING PROCESS

BACKGROUND OF THE INVENTION

1. Field of Invention

The present invention relates to microelectromechanical system (MEMS) device. More particularly, the present invention relates to the MEMS microphone with sensitivity trimming circuit.

2. Description of Related Art

MEMS microphone has a sensing diaphragm to sense the vibration of sound in pressure. The sensing diaphragm forms as a part of a sensing capacitor, so that the sound is converted into electric signal.

FIG. 1 is drawing, schematically illustrating the sensing mechanism by a diaphragm. In FIG. 1, a diaphragm 100 shown in perspective view, such as a thin film. In side view, the diaphragm 100 has a radius R and is at a free state 102, so that the diaphragm 100 is in a flat plane. When an air pressure, produced by a sound signal, is applied to the diaphragm 100, the diaphragm 100 becomes a bending state. Causing a displacement of the diaphragm 100. As can be understood, the diaphragm 100 vibrates with the pressure variance of the sound. If the diaphragm 100, as one electrode, is formed with a fixed electrode as a capacitor, the displacement of the diaphragm 100 change the capacitance followed the capacitance relation of $C = \in A/d$, in which d is changed with the source pressure. As a result, the sensing capacitor can sense the sound.

FIG. 2 is a circuit, schematically illustrating a circuit of the MEMS microphone. In FIG. 2, the diaphragm capacitor 122 of the MEMS microphone 120 has two electrodes with one electrode in a diaphragm. A capacitor biasing voltage source 128 connecting to the diaphragm capacitor 122 through a high impendence resistor 129 provides constant charges Q on the diaphragm. The diaphragm senses the sound pressure and produces a displacement $\Delta d$, causing change of capacitance. The known laws are $Q = CV$ and $C = \in A/d$. In which $\in$ is Permittivity of free space, A is capacitor area. Under the condition of fix charge Q, then a relation can be obtained as $\Delta V / V_{PP} = \Delta d / d$, in which d is the distance of the two electrode of the capacitor at the natural state without sound. $\Delta d$ is the displacement due to pressure change on the diaphragm. The voltage signal $\Delta V$ is amplified by the source follower circuit 124 with amplification Av1 and the amplifier 126 with amplification Av2 to obtain the Vout=Av1*Av2*$\Delta V$.

However, the mechanical property of sensing diaphragm of the diaphragm capacitor 122 manufactured by standard CMOS process is variable due to the variance of thin film thickness and residual stress, causing the sensitivity is not easy to be fabricated to have the preset level. This cause the performance MEMS microphone is not stable.

How to obtain a stable sensitivity is one of issues, needed to be considered. The solution may be taken by developing the precise fabrication process, causing high cost.

SUMMARY OF THE INVENTION

The invention provides a MEMS microphone with a sensitivity trimming circuit, so that the sensitivity can be finally adjusted without much effort on improving the fabrication process.

In an aspect, the invention provides a microelectromechanical system (MEMS) device. The microelectromechanical system (MEMS) device includes a diaphragm capacitor, an amplifier, and a programmable trimming circuit. The diaphragm capacitor is connected between a capacitor biasing voltage source and a ground for producing a sensing voltage signal. The amplifier is for amplifying the sensing voltage signal as an output voltage signal. The programmable trimming circuit is implemented with the amplifier to trim a gain or implemented with the capacitor biasing voltage source to trim a voltage of the capacitor biasing voltage source applied on the diaphragm capacitor, whereby the output voltage signal has a target sensitivity.

In an aspect, the invention provides a method for trimming sensitivity of a microelectromechanical system (MEMS). The method includes measuring the output voltage signal at the amplifier to obtain a primary sensitivity. Then, a difference between the primary sensitivity and a target sensitivity is measured and a content is determined corresponding to a compensation level to the difference. The programmable trimming circuit is programmed with the content to trim the gain of the amplifier or trim voltage of the capacitor biasing voltage source for applying on the diaphragm capacitor, according to the compensating level.

In an aspect, the invention provides a microelectromechanical system (MEMS) device includes a MEMS structure, an amplifier, and a programmable trimming circuit. The MEMS structure has a capacitive sensing element, wherein the capacitive sensing element having at least one capacitor connected between a capacitor biasing voltage source and a ground for producing a sensing voltage signal. The amplifier is amplifying the sensing voltage signal as an output voltage signal. The programmable trimming circuit is implemented with the amplifier to trim a gain or implemented with the capacitor biasing voltage source to trim a voltage of the capacitor biasing voltage source applied on the capacitor, whereby the output voltage signal has a target sensitivity.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the present invention, the gain of amplifier and/or the voltage of capacitor biasing voltage can be trimmed, so as to compensate the sensitivity to have the target sensitivity with programmable manner. Several embodiments are provided for describing the present invention but the present invention is not limited to the provided embodiments. In addition, the embodiments can be properly combined to each other.

Figure 1:
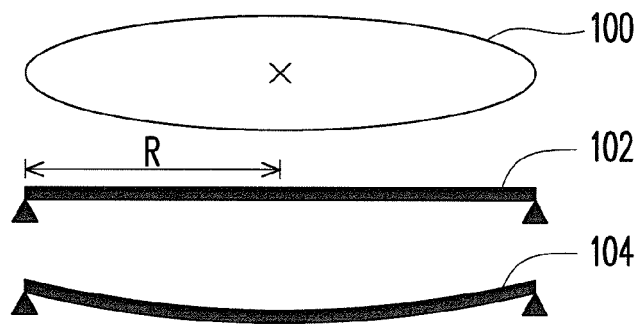
FIG. 1 is drawing, schematically illustrating the sensing mechanism by a diaphragm.
Figure 2:
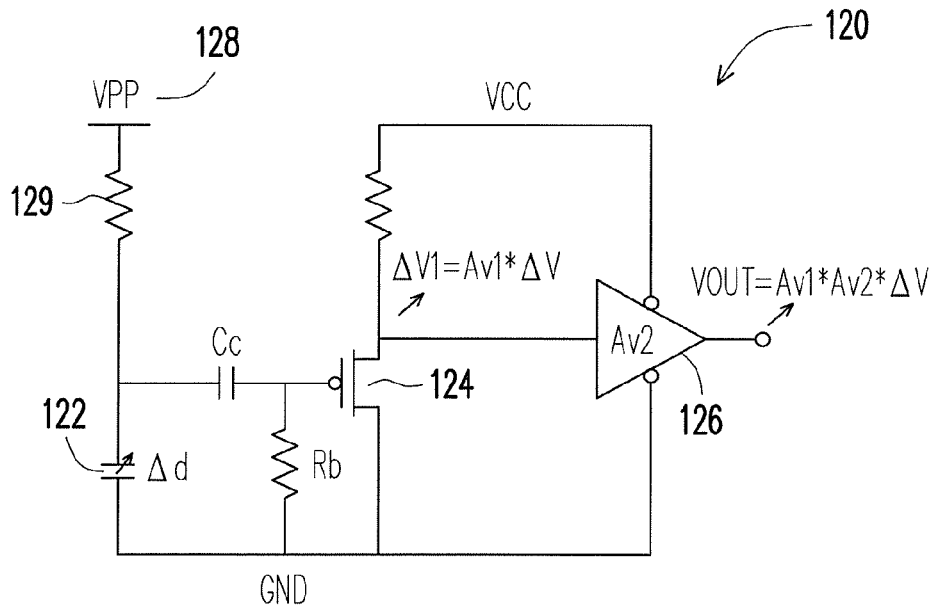
FIG. 2 is a circuit, schematically illustrating a circuit of the MEMS microphone.
Figure 3A:
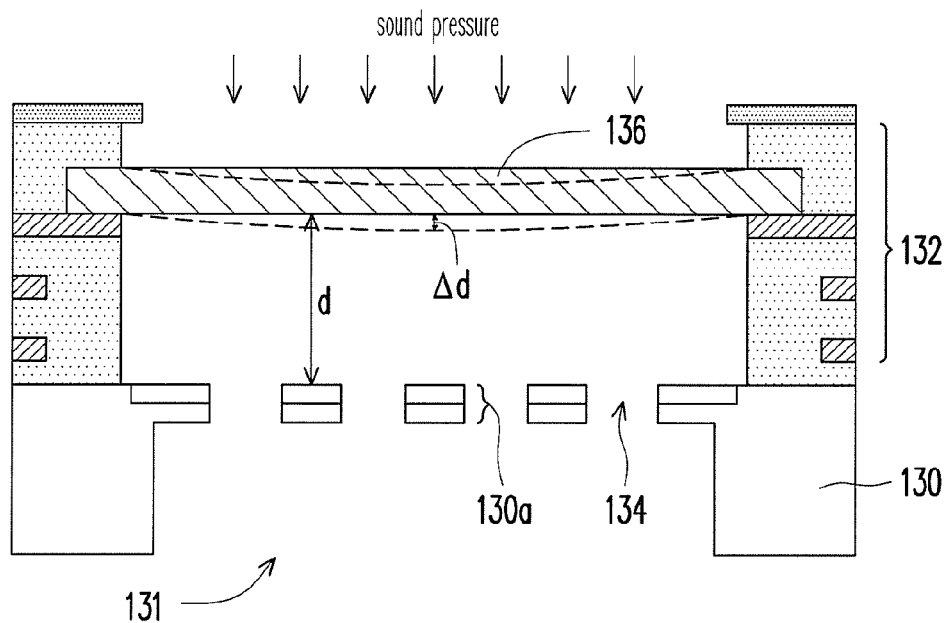
FIGS. 3A and 3B are cross-sectional drawings, schematically illustrating MEMS structures with a diaphragm.
Figure 3B:
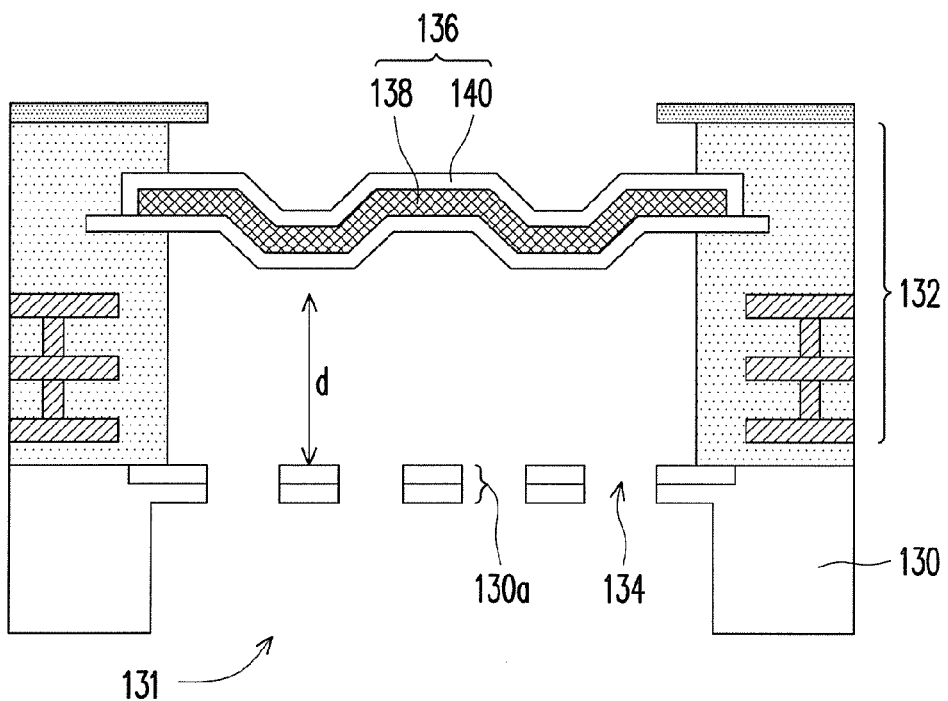

FIGS. 3A-3B are cross-sectional drawings, schematically illustrating MEMS structures with a diaphragm. Generally, in FIG. 3A, a MEMS device with diaphragm 136 is shown. The MEMS device has a semiconductor substrate 130 and a dielectric structural layer 132 on the silicon substrate 130. The semiconductor substrate 130 has a cavity 131 and several venting holes 134 in the active region 130a, which also serving a fixed electrode of a MEMS capacitor. The dielectric structural layer 132 holds a diaphragm 136. The diaphragm 136 senses the acoustic signal. The other circuit part is also formed in the dielectric structural layer 132. When the diaphragm 136 is art the normal state, there is a distance d between the diaphragm 136 and substrate 130 at the active region 130a. It can be known that the MEMS structure is not limited to FIG. 3A. In general, since the ends of the diaphragm 136 are fixed in the dielectric structural layer 132, the sensitivity cannot be well controlled to match the design target.

In FIG. 3B, the structure of the diaphragm 136 can be a composite films with inner dielectric 138 and conductive layer 140 as a corrugated structure to reduce thin film residual stress to influence sensitivity. However it still has variance of diaphragm compliance due to thin film thickness variation, which will cause sensitivity variation.

Figure 4:
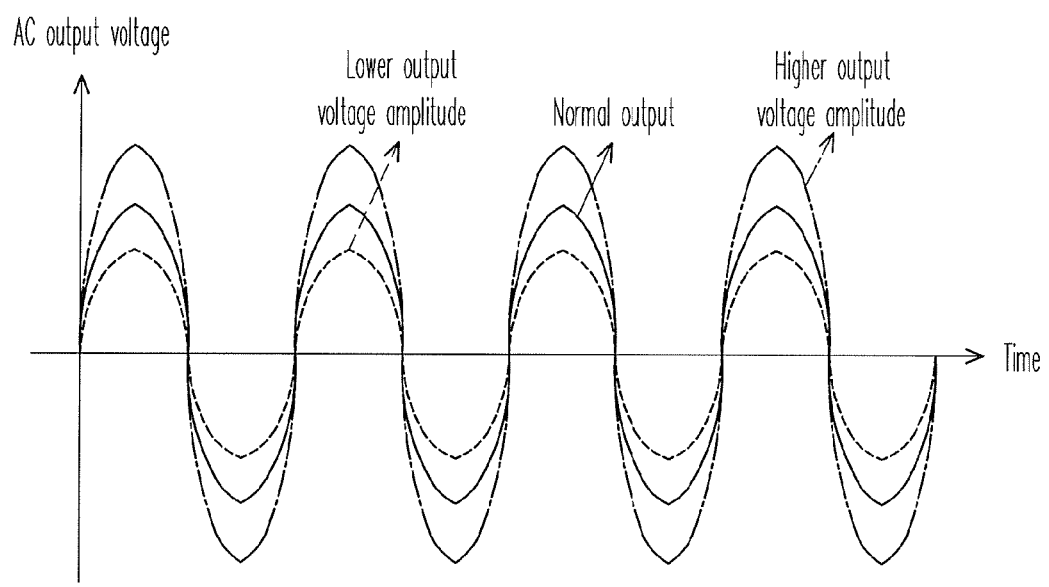
FIG. 4 is a drawing, schematically illustrating the output signal in different sensitivity.

FIG. 4 is a drawing, schematically illustrating the output signal in different sensitivity. In FIG. 4, based on the structure in FIG. 3, if the diaphragm 136 is satisfying the sensitivity in design, the output voltage signal is shown in solid line in normal output. However, if the diaphragm 136 is over sensitive, the output voltage signal has higher output voltage amplitude, as shown in dot-broken line. If the diaphragm 136 is less sensitive, the output voltage signal has lower output voltage amplitude, as shown in dash line.

Figure 5:
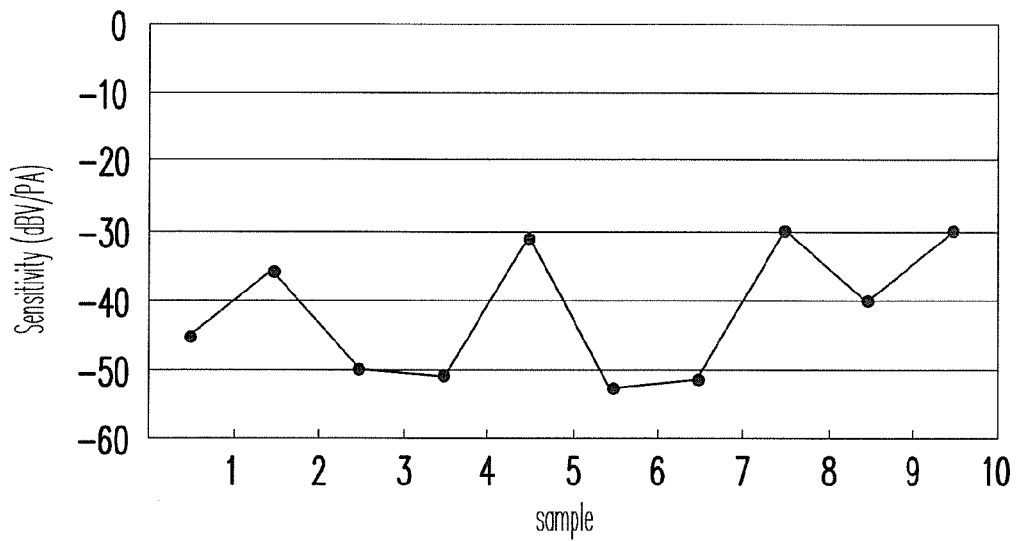
FIG. 5 is a drawing, schematically illustrating a statistic result of the sensitivity for multiple MEMS devices without trimming.

FIG. 5 is a drawing, schematically illustrating a statistic result of the sensitivity for multiple MEMS devices without trimming. In FIG. 5, taking 10 MEMS device samples without trimming the sensitivity as the example. The sensitivity is measured in unit of dB. The MEMS devices are designed to have the sensitivity at −40 dB. However, due to the fabrication variance, the diaphragm also has compliance variation, which causes the output signal with output variation.

Figure 6:
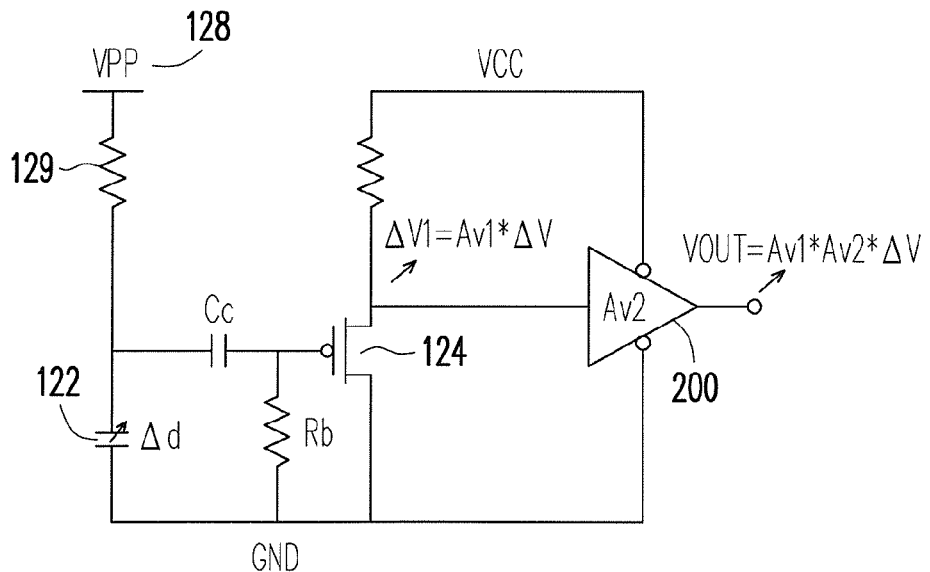
FIG. 6 is a circuit diagram, schematically illustrating a MEMS microphone, according to an embodiment of the present invention.

In at least considering the issue of sensitivity caused by the diaphragm compliance variation, the present invention further proposes a mechanism to trim the sensitivity. FIG. 6 is a circuit diagram, schematically illustrating a MEMS microphone, according to an embodiment of the present invention. In FIG. 6, the MEMS microphone is taken as the example. A capacitor biasing voltage source VPP 128 applied to the diaphragm capacitor 122 through a high impendence resistor 129 to provide constant charges on the diaphragm. A source follower circuit 124 is coupled to the diaphragm capacitor 122 through a de-couple capacitor Cc, providing a high input impendence and amplifying the voltage signal generated by diaphragm vibrating. However, the amplifier 200 has also implemented with a trimming circuit, in this embodiment. In other words, the gain of the amplifier 200 can be trimmed by a programming mechanism. As a result, the gain Av2 of the amplifier 200 is programmable for approaching to the target sensitivity.

The mechanism in the circuit is following. The MEMS capacitor 122 produces Δd with sound pressure applying and thereby produces $\Delta V = (\Delta d/d) * V_{PP}$. The sensitivity (S) is defined as:

$$S = V\text{out}/\text{Pressure} (\text{denoted As } V/PA) = (Av1 * Av2 * Vpp/d) * \Delta d.$$

In other words, when the parameter Δd is not at the designed value, the parameters of the Av1, Av2, and/or Vpp can be trimmed to compensate the parameter Δd. This is essential to the MEMS device to achieve the target sensitivity because the diaphragm compliance is not easy to control and fabricated to have the desired performance.

Figure 7:
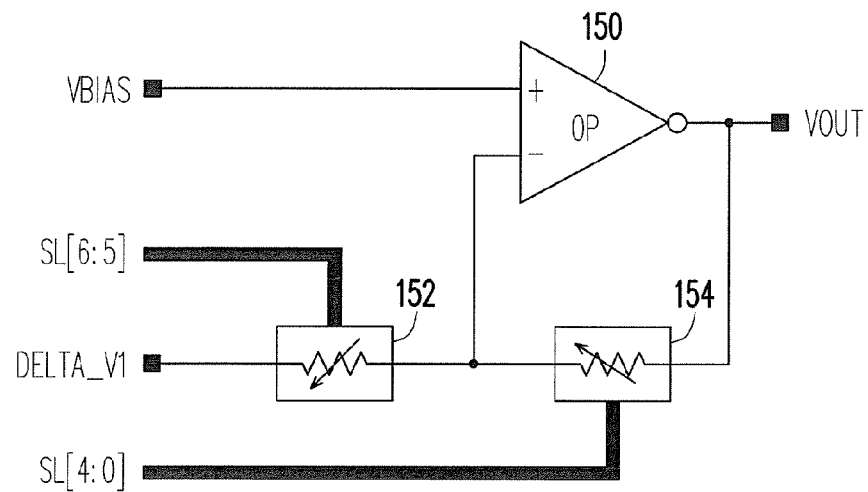
FIG. 7 is a circuit diagram, schematically illustrating the circuit of the amplifier with trimming mechanism, according to an embodiment of the present invention.

FIG. 7 is a circuit diagram, schematically illustrating the circuit of the amplifier with trimming mechanism, according to an embodiment of the present invention. In FIG. 7, the amplifier 200 can be, for example, an operational amplifier 150, implemented with variable resistors 152 and 154. The gain of the operation amplifier is proportional the ratio of the resistances for the resistor 154 to the resistor 152. The variable resistors 152 and 154 are programmable, so that the resistances of the variable resistors 152 and 154 can be set by a content of multiple bits, such as 7 bits, denoted by SL. For example, the first five bits SL[4:0] are used to control the variable resistor 154 and two bits SL[6:5] are used to control the variable resistor 152. The voltage signal ΔV (delta_V1) is input to one terminal of the amplifier 150 while the other terminal is applied with a reference voltage VBIAS. As a result, the output signal has the voltage VOUT.

Figure 8:
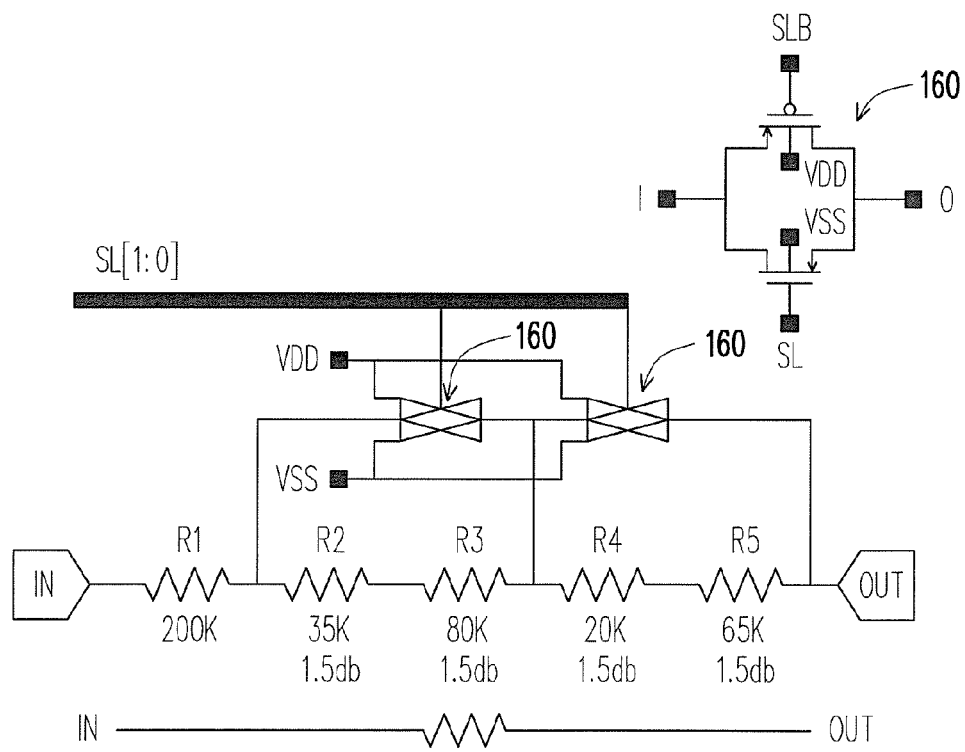
FIG. 8 is a circuit diagram, schematically illustrating the trimming circuit, according to an embodiment of the present invention.

FIG. 8 is a circuit diagram, schematically illustrating the trimming circuit, according to an embodiment of the present invention. In FIG. 8, the more detail to form the programmable variable resistor includes, for example, a set of resistors, such as R1-R5, connected in series. The switching circuits 160 can be connected with a specific part of the resistors in parallel. Each switch 160, such as the circuit shown on the upper drawing, can be controlled by one bit. The actual circuit is not just limited to the shown circuit. When a selected one of the switches 160 is conducted, causing the connected part of the resistors to be short. As a result, the total resistance is changed.

For example, when SL0=0 and SL1=0, the total resistance is 400 Kohmn. When SL0=0 and SL1=1, the connected part of the resistors R2 and R3 to be short with switch, therefore the total resistance becomes 285 Kohmn.

Depending on the arrangement to have the number of variable states, the number of the switches, corresponding to the number of the control bits, the resistances for the resistors can be preset. Since the gain of the operation amplifier is at least depending on two resistors, the other variable resistor 154, controlled by five bits, can be configured in the same manner. As a result, each trimming step can increase or decrease by a preset sensitivity, such as 3 dB in each change. However, this is not the only way to do it. For an easy way, a table may be set up. In a specific case for changing 3 dB in each trimming step, Table 1 can be, for example, set. In addition, if the MEMS device has the output sensitivity in 29 dB, the content of the bits SL=0000000 does not change the sensitivity. If it needs to trim the gain by increasing 3 dB, then the content of SL=0100000 can be set, for example. Likewise, if it needs to trim the gain by decreasing 6 dB, then the content of SL=0011000 can be set, for example.

TABLE 1

| SL [6:0] | Gain difference to default | Gain |
|---|---|---|
| 1100000 | 6 db | 35 db |
| 0100000 | 3 db | 32 db |
| 0000000 | 0 db | 29 db |
| 0010000 | −3 db | 26 db |
| 0011000 | −6 db | 23 db |
| 0011100 | −9 db | 20 db |
| 0011110 | −12 db | 17 db |
| 0011111 | −15 db | 14 db |

The same principle can be applied to for the actual design in need, not limited to the Table 1 and the 7 bits in use for control. Actually, the number of the bits being used is not limited to 7 bits. Basically, more bits would allow more precise trimming process but cause more cost. In other words, the number of bits is depending on how the trimming precision to be achieved when the fabrication cost is consideration.

Figure 9:
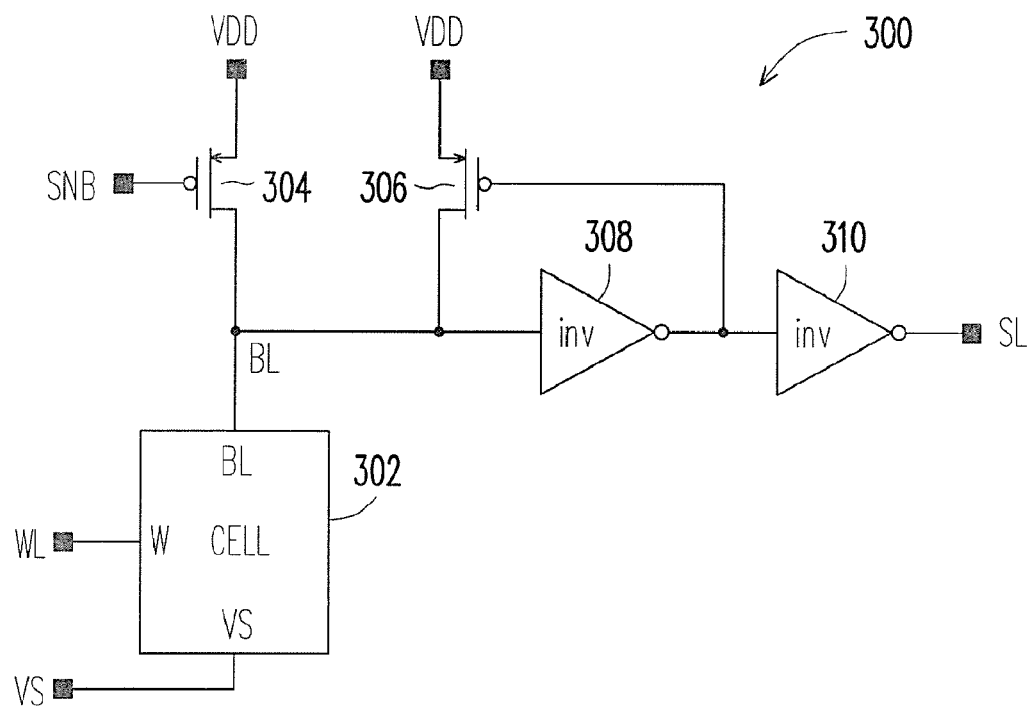
FIG. 9 is a circuit diagram, schematically illustrating the trimming circuit with programmable capability, according to an embodiment of the present invention.

Since the switches can be controlled by bits, respectively. A non-volatile programmable memory can be implemented together to set the content SL of the bits. To write one bit, there are several ways to achieve it. Several embodiments are provided as the example. FIG. 9 is a circuit diagram, schematically illustrating the trimming circuit with programmable capability, according to an embodiment of the present invention. In FIG. 9, the programmable circuit 300 for one cell is using the memory cell 302, which can be MOS memory cell or fuse. The MOS memory cell 302 can be written by the world line WL and the bit line BL. For example, cell 302 acts as low resistance resistor before programming, cell 302 acts as high resistance resistor after programming. By the effect of the inverters 308 and 310 with the PMOS transistors 304 and 306, the content SL in bits can be written to have "0" before the cell 302 is programmed or "1" after the cell 302 is programmed. The way to program the memory cell 302 can be the usual manner. However, the essential part includes the implementation of the amplifier in MEMS device to obtain the target sensitivity.

Figure 10A:
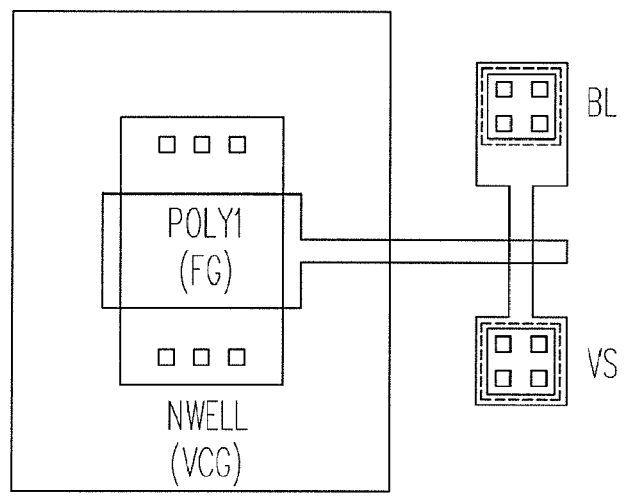
FIG. 10A is a top view, schematically illustrating a structure of a memory cell being taken in an embodiment of the present invention.
Figure 10B:
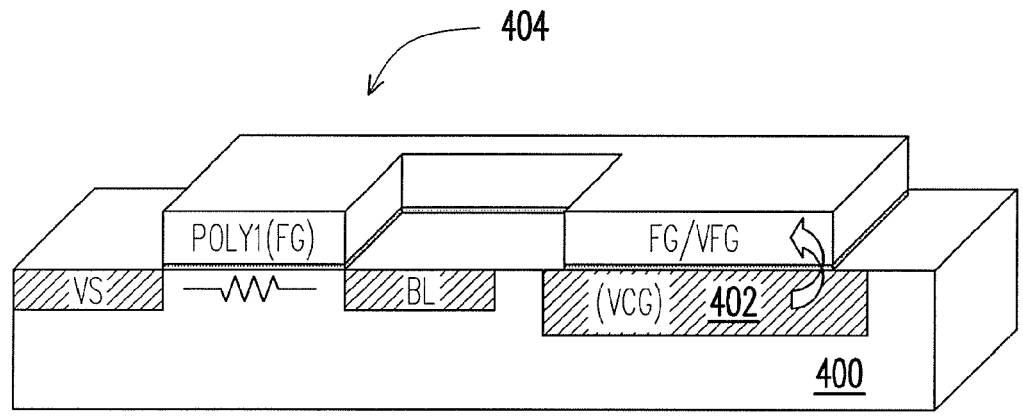
FIG. 10B is a perspective side view, schematically illustrating the structure of the memory cell in FIG. 10B.

The nonvolatile memory cell can be formed by MOS device. FIG. 10A is a top view, schematically illustrating a structure of a memory cell being taken in an embodiment of the present invention. FIG. 10B is a perspective side view, schematically illustrating the structure of the memory cell in FIG. 10B. In FIGS. 10A and 10B, the MOS memory cell is formed on the P-type substrate (PSUB) 400. A N-type doped well (NWELL) 402, serving a control gate (CG), is formed in the substrate 400 while a MOS transistor 404 is also formed on the substrate 400. The floating gate (FG) is coupled to the region above the NWELL 402 so that when the operation voltage VCG is applied to the NWELL 402 as the control gate for read or write, If the high voltage VCG is applied on control gate, the floating gate induces corresponding voltage and causes electron to inject into the floating gate. On the other hand, when a normal read voltage is applied on the control gate, the transistor 402 will be turned off or on, depending on whether the FG with electron trapped or not. Depending on the quantity of resistance determines the content of the memory cell stored.

Figure 11:
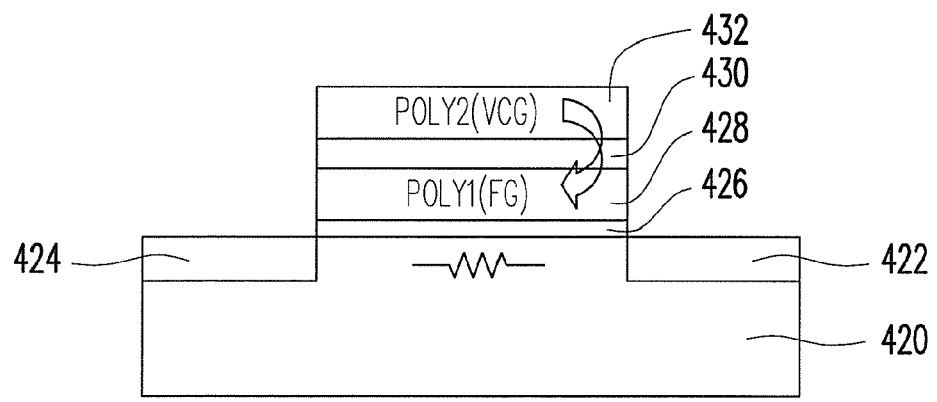
FIG. 11 is a cross-sectional view, schematically illustrating the structure of the memory cell.

Alternatively, the present invention cal also use another usual non-volatile memory cell based on two polysilicon layers in stack. FIG. 11 is a cross-sectional view, schematically illustrating the structure of the memory cell. In FIG. 11, as usually known, the substrate 420 has the source region 422 and the drain region 424. The gate oxide layer 426 is on the substrate between the source region 422 and the drain region 424. A polysilicon layer 428 as a floating gate (FG) is disposed on the gate oxide layer 426. Another insulating layer 430 is on the polysilicon layer 428, and then a polysilicon layer 432 as the control gate is disposed on the insulating layer 430. This is the usual memory cell being used so as to store binary contents for the control bit of SL.

Figure 12:
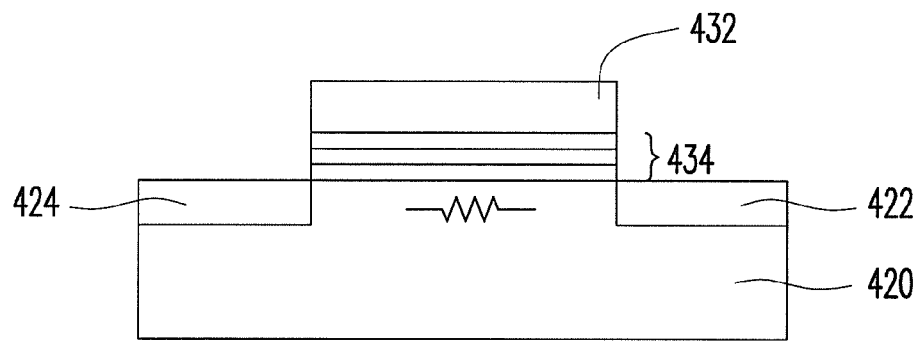
FIG. 12 is a cross-sectional view, schematically illustrating another structure of the memory cell.

Even further, FIG. 12 is a cross-sectional view, schematically illustrating another structure of the memory cell. In another structure of the memory cell, the nitride serving as a charge storage layer in the O/N/O (Oxide/Nitride/Oxide) stack layer 434 can replace the floating gate in FIG. 11. This memory cell is also conventionally known to the one in the art, and can be easily implemented into the programmable switching circuit for store the content of the control bit.

Figure 13:
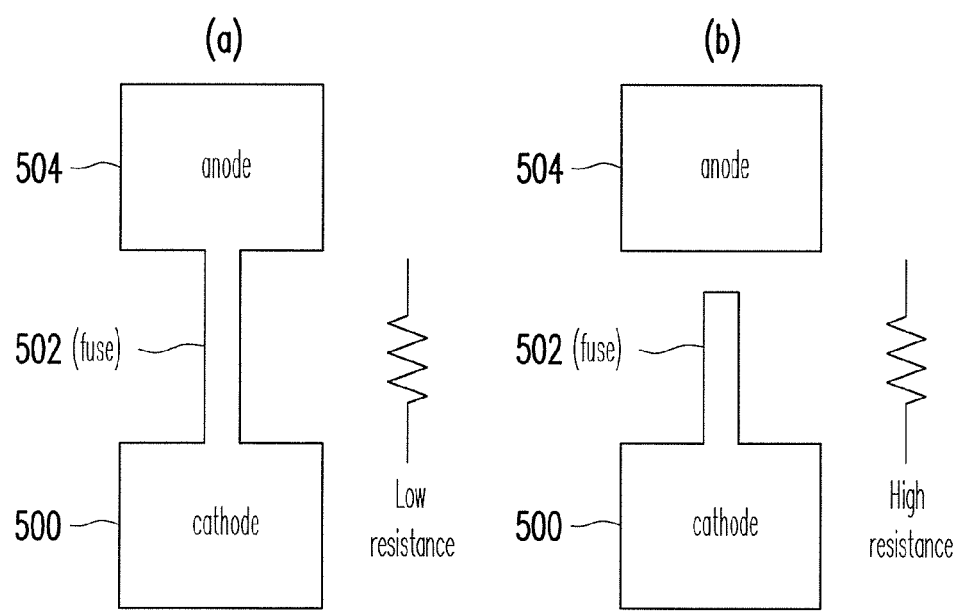
FIG. 13 is a drawing, schematically illustrating a structure of the memory cell in fuse structure.
Figure 14:
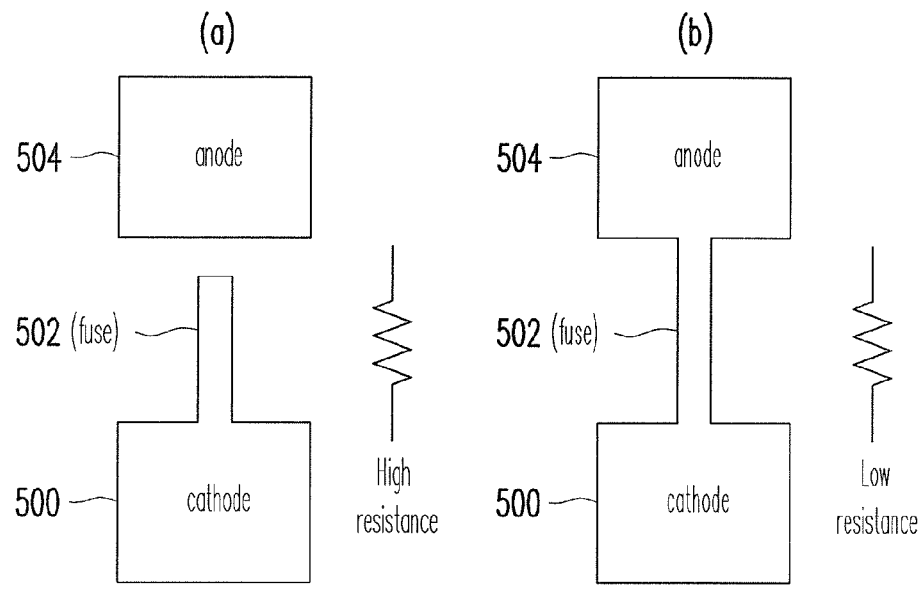
FIG. 14 is a drawing, schematically illustrating another structure of the memory cell in fuse structure.

The present invention is not limited to a specific type of memory cell. Further, in order to memory the content of the control bits SL, fuse can also be used instead of the MOS memory cell. FIG. 13 is a drawing, schematically illustrating a structure of the memory cell in fuse structure. In FIG. 13, a fuse 502 is connected between a cathode 500 and an anode 504 before programming, so that a low resistance exits, representing one state of "0" and "1". When the cell is programmed by breaking the fuse 502, a high resistance exists between the cathode 500 and the anode 504, represent another state of "0" and "1". Likewise, FIG. 14 is a drawing, schematically illustrating another structure of the memory cell in fuse structure. In FIG. 14, it is similar to FIG. 13, however, the fuse 502 is at open state before programming, so that a high resistance exists between the cathode 500 and the anode 504. After programming, the fuse 502 is changed to the connection state, so that a low resistance exists between the cathode 500 and the anode 504. The binary data can be stored depending on the level of the resistance in two states. The invention is not necessary to be limited to taking a specific-type of memory for programming and storing the control bits SL.

Figure 15:
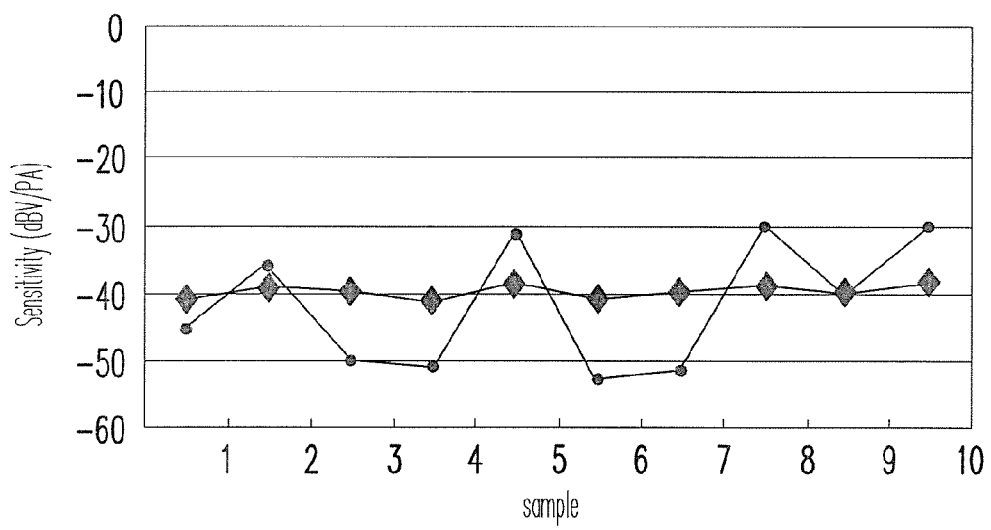
FIG. 15 is a drawing, schematically illustrating the sensitivity of the MEMS device with and without trimming effect.

FIG. 15 is a drawing, schematically illustrating the sensitivity of the MEMS device with and without trimming effect. In FIG. 15, in comparing with the sensitivity in FIG. 5, the MEMS devices are properly trimmed to approach the target sensitivity at −40 dB. Taking the MEMS device 1 as the example for description, the sensitivity of the less than the desired −40 dB, so that the gain is trimmed to raise up the gain. For the MEMS device 2, since the sensitivity is too high, the gain is trimmed to have less gain. Since the trimming step for the sensitivity is not continuous, depending on the difference between the trimming steps, the trimmed sensitivity may be not exactly at −40 dB but may be quite close.

Figure 16:
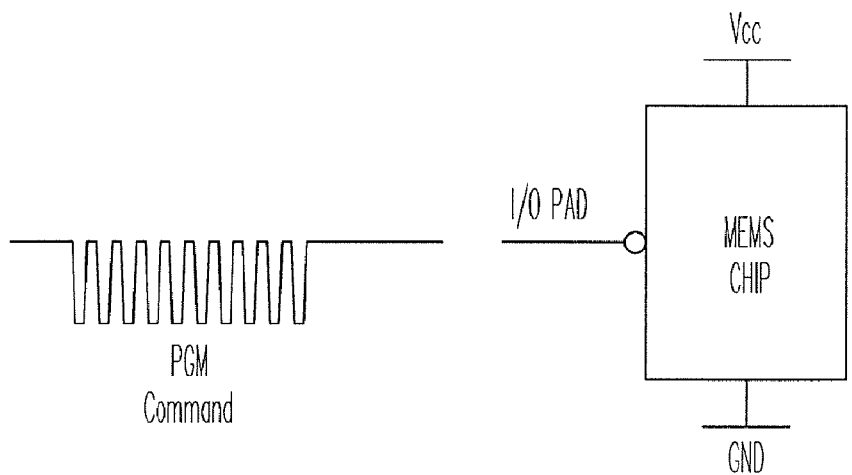
FIG. 16 is a drawing, schematically illustrating a configuration for trimming the MEMS device.

FIG. 16 is a drawing, schematically illustrating a configuration for trimming the MEMS device. In FIG. 16, in the actual trimming process, the MEMS device is usually formed as a MEMS chip, which includes an I/O pad. The programming command can be input from the I/O pad, so as to program the memory in the trimming circuit of the MEMS chip.

Figure 17:
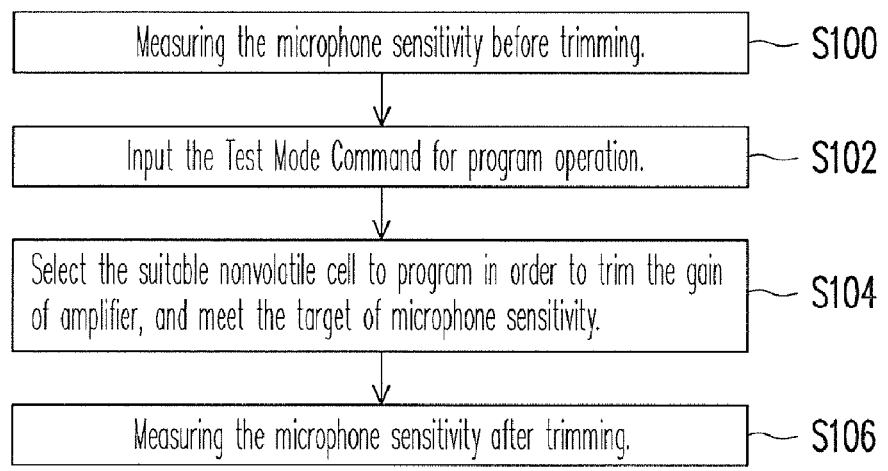
FIG. 17 is a process, schematically illustrating a trimming process for the MEMS device.

FIG. 17 is a process, schematically illustrating a trimming process for the MEMS device. In FIG. 17, based on the MEMS device with the trimming circuit, the trimming process can be performed in several steps, for example. MEMS microphone is taken as an example of the MEMS chip in FIG. 16 to be trimmed. In step S100, the microphone sensitivity is measured before trimming. As a result, the difference between the target sensitivity and the measured sensitivity can be obtained. In step 102, the test mode command for program operation is input to the MEMS microphone. Because the sensitivity difference between the target sensitivity and the measured sensitivity has been known, according to the trimming circuit, the amplifier gain can be trimmed by programming with the content, such as the content in Table 1. Thus, in step 104, suitable nonvolatile cells are selected for programming to trim the gain of amplifier and meet the target of microphone sensitivity. Basically, when the sensitivity difference is obtained, the quantity for the gain to be trimmed can be determined by looking up the table, such as Table 1, to determine the closest one for programming. In step S106, after programming the trimming circuit to trim the gain of amplifier, the microphone sensitivity can be measured again so as to make sure the trimming is proper.

The foregoing trimming circuit is implemented with the amplifier. However, the same trimming mechanism can be implemented to the other part in need, such as the capacitor biasing voltage Vpp, applied to the MEMS diaphragm capacitor. The variance of the voltage Vpp would cause the change of the signal ΔV. Under the same gain of amplifier, the sensitivity can also be trimmed by trimming the voltage Vpp.

Figure 18:
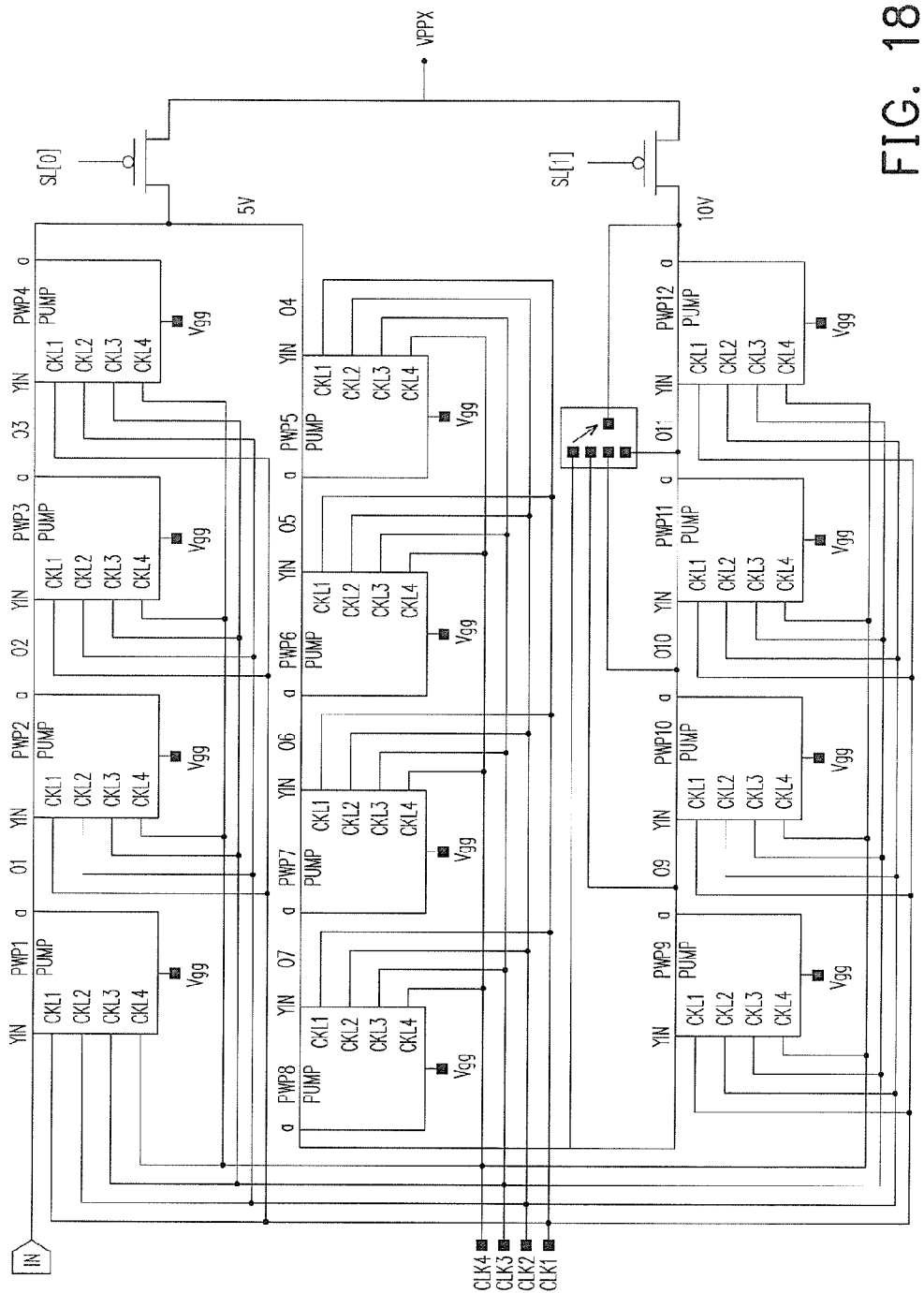
FIG. 18 is a circuit diagram, schematically illustrating a trimming circuit with the power source.

The voltage Vpp can be set by set in various step. Then, the programmable trimming circuit can trim the voltage Vpp. FIG. 18 is a circuit diagram, schematically illustrating a trimming circuit with the power source. In FIG. 18, a fixed voltage power can be input at the input terminal IN of the trimming circuit. Depending on the different pumping stages for voltage pumping, for instance, two voltages of 5 V and 10 V can be obtained. However, for example, two switching transistors are controlled by two bits SL[0] and SL[1], respectively. Depending on the selection of the bit content SL[1:0], the voltages in combination can be output as the voltage VPPX, which is to be applied to the MEMS diaphragm capacitor 122. Due to the voltage VPP is trimmed by the programmable manner, the sensitivity of the MEMS device can be trimmed.

The invention can have application in microphone but not the only application. Other MEMS device, such as gyro device and pressure sensor, based on the MEMS capacitor can adapt the invention for trimming the gain.

Figure 19:
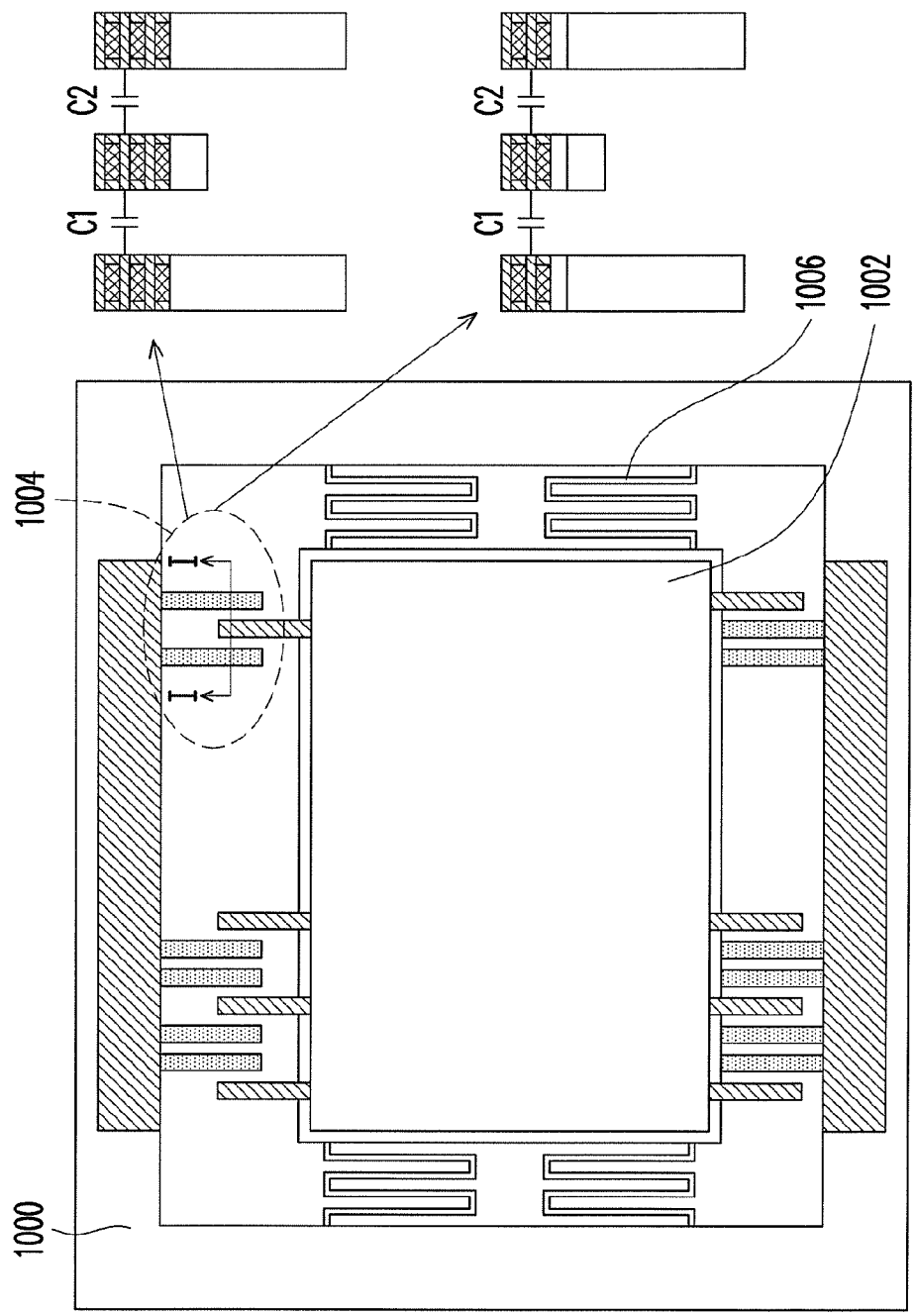
FIG. 19 is a top view, schematically illustrating a structure of MEMS device in application on acceleration meter, according to an embodiment of the invention.

FIG. 19 is a top view, schematically illustrating a structure of MEMS device in application on acceleration meter, according to an embodiment of the invention. In FIG. 19, one of the various alternative applications of the invention is accelerator meter. The accelerator meter in MEMS structure can includes an anchor 1000, the mass body 1002 to sense the acceleration. The spring 1006 holds the mass body 1002. The capacitors 1004 can be formed, as indicated by 1004 at one of capacitor sets. The cross-sectional structures at I-I is shown as well. The capacitance of the capacitors C1 and C2 is composed in this example. When the acceleration occurs, the mass body 1002 is accelerated and causes the change of the capacitances at C1 and C2, so as to determine the acceleration speed. In other words, the variance of capacitance on the capacitors can be detected. However, the sensing gain can be trimmed to the desired level.

Figure 20:
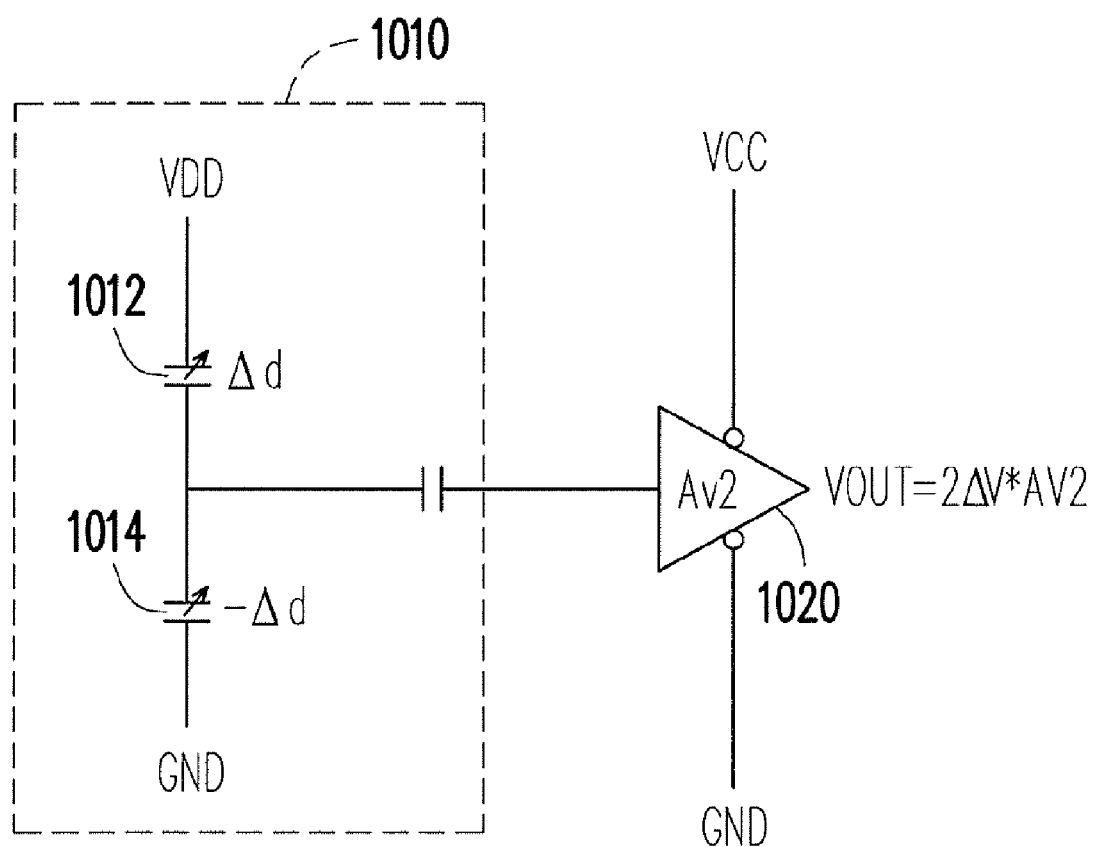
FIG. 20 is a circuit diagram, schematically illustrating the circuit for an acceleration meter.

FIG. 20 is a circuit diagram, schematically illustrating the circuit for an acceleration meter. In FIG. 20, the two capacitors C1 and C2 in FIG. 19 can be treated as the capacitor 1012 and 1014 in a circuit 1010. As a result, the signals caused by the quantity of Δd can be amplified by the amplifier 1020, which can be trimmed to the desired level. The sensing and trimming mechanism is the same as previous description but the actual application on MEMS device is different.

It should be noted that, the trimming circuit can be changed in accordance with the actual circuit in design. However, the function of the trimming circuit in programmable manner still remains in the MEMS device. The invention is also not just limited to the circuit in FIG. 18. As a result, the sensitivity of the MEMS device can be finally trimmed to the target sensitivity.

In general, any electronic part, which affects the sensitivity, can be trimmed by the same principle although the actual circuit may be different. The present invention proposes the programmable trimming circuit to implement with the MEMS device. As a result, the sensitivity can be trimmed to the target sensitivity, so that the fabrication process for the diaphragm may be simplified with easier process in less cost.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A microelectromechanical system (MEMS) device, comprising:
    a diaphragm capacitor, connected between a capacitor biasing voltage source and a ground for producing a sensing voltage signal;
    an amplifier, for amplifying the sensing voltage signal as an output voltage signal; and
    a programmable trimming circuit, implemented with the amplifier to trim a gain or implemented with the capacitor biasing voltage source to trim a voltage of the capacitor biasing voltage source applied on the diaphragm capacitor, whereby the output voltage signal has a target sensitivity.

2. The MEMS device of claim 1, wherein
    the amplifier is an operational amplifier having a first variable resistor and a second variable resistor for determining a gain; and
    the programmable trimming circuit implemented with the amplifier comprises:
        a programmable nonvolatile memory, having a number of bits, wherein the bits are programmed to a content; and
        a switching circuit, receiving the content of the bits and controlling the first variable resistor and the second variable resistor to respectively have a first resistance and a second resistance for obtaining the gain.

3. The MEMS device of claim 2, wherein each of the first variable resistor and the second variable resistor has a set of resistors in series, wherein the switching circuit can short a selected part of the resistors, according to the content of the bit, to have the first resistance and the second resistance.

4. The MEMS device of claim 2, wherein the switching circuit comprises a plurality of switches in series connection, respectively controlled by one of the bits to switch on or off, and each of the switches is also connected with a part of the resistors in parallel connection.

5. The MEMS device of claim 2, wherein the programmable nonvolatile memory comprises nonvolatile memory cells to program with the content of the bits.

6. The MEMS device of claim 2, wherein the programmable nonvolatile memory comprises nonvolatile fuses to program with the content of the bits.

7. The MEMS device of claim 2, wherein each of the content of the bits trims the gain by a specific factor.

8. The MEMS device of claim 1, wherein the MEMS device is a MEMS microphone or a MEMS acceleration meter.

9. The MEMS device of claim 1, wherein a source follower circuit is coupled between the diaphragm capacitor and the amplifier.

10. The MEMS device of claim 1, wherein
the capacitor biasing voltage source has a plurality of voltage steps for output; and
the programmable trimming circuit implemented with the capacitor biasing voltage source comprises:
a programmable nonvolatile memory, having a number of bits, wherein the bits are programmed to a content; and
a switching circuit, receiving the content of the bits and trimming a variable voltage of the capacitor biasing voltage source.

11. A method for trimming sensitivity of a microelectromechanical system (MEMS) device, wherein the MEMS device comprises: a diaphragm capacitor, connected between a capacitor biasing voltage source and a ground for producing a sensing voltage signal; an amplifier for amplifying the sensing voltage signal as an output voltage signal; and a programmable trimming circuit, implemented with the amplifier to trim a gain or implemented with the capacitor biasing voltage source to trim a voltage of the capacitor biasing voltage source applied on the diaphragm capacitor, the method comprising:
measuring the output voltage signal at the amplifier to obtain a primary sensitivity;
estimating a difference between the primary sensitivity and a target sensitivity and determining a content corresponding to a compensation level to the difference; and
programming the programmable trimming circuit with the content to trim the gain of the amplifier or trim voltage of the capacitor biasing voltage source for applying on the diaphragm capacitor, according to the compensating level.

12. The method of claim 11, wherein the step of estimating the difference between the primary sensitivity and the target sensitivity comprising checking a table for determining the content.

13. The method of claim 11, wherein the programmable trimming circuit is formed by:
taking an operational amplifier as the amplifier, having a first variable resistor and a second variable resistor for determining a gain; and
implementing the programmable trimming circuit with the amplifier, and forming programmable trimming circuit by:
providing a programmable nonvolatile memory, having a number of bits, wherein the bits are programmed to a content; and
providing a switching circuit for receiving the content of the bits and controlling the first variable resistor and the second variable resistor to respectively have a first resistance and a second resistance for obtaining the gain.

14. The method of claim 11, wherein the programmable trimming circuit is formed by:
the programmable trimming circuit implemented with the capacitor biasing voltage source comprises:
providing a programmable nonvolatile memory, having a number of bits, wherein the bits are programmed to a content; and
providing a switching circuit, receiving the content of the bits and trimming variable voltage of the capacitor biasing voltage source.

15. A microelectromechanical system (MEMS) device, comprising:
a MEMS structure, having a capacitive sensing element, wherein the capacitive sensing element having at least one capacitor connected between a capacitor biasing voltage source and a ground for producing a sensing voltage signal;
an amplifier, amplifying the sensing voltage signal as an output voltage signal; and
a programmable trimming circuit, implemented with the amplifier to trim a gain or implemented with the capacitor biasing voltage source to trim a voltage of the capacitor biasing voltage source applied on the capacitor, whereby the output voltage signal has a target sensitivity.

16. The MEMS device of claim 15, wherein the MEMS structure includes acceleration meter, gyro, microphone or pressure sensor.

* * * * *